UNITED STATES PATENT OFFICE.

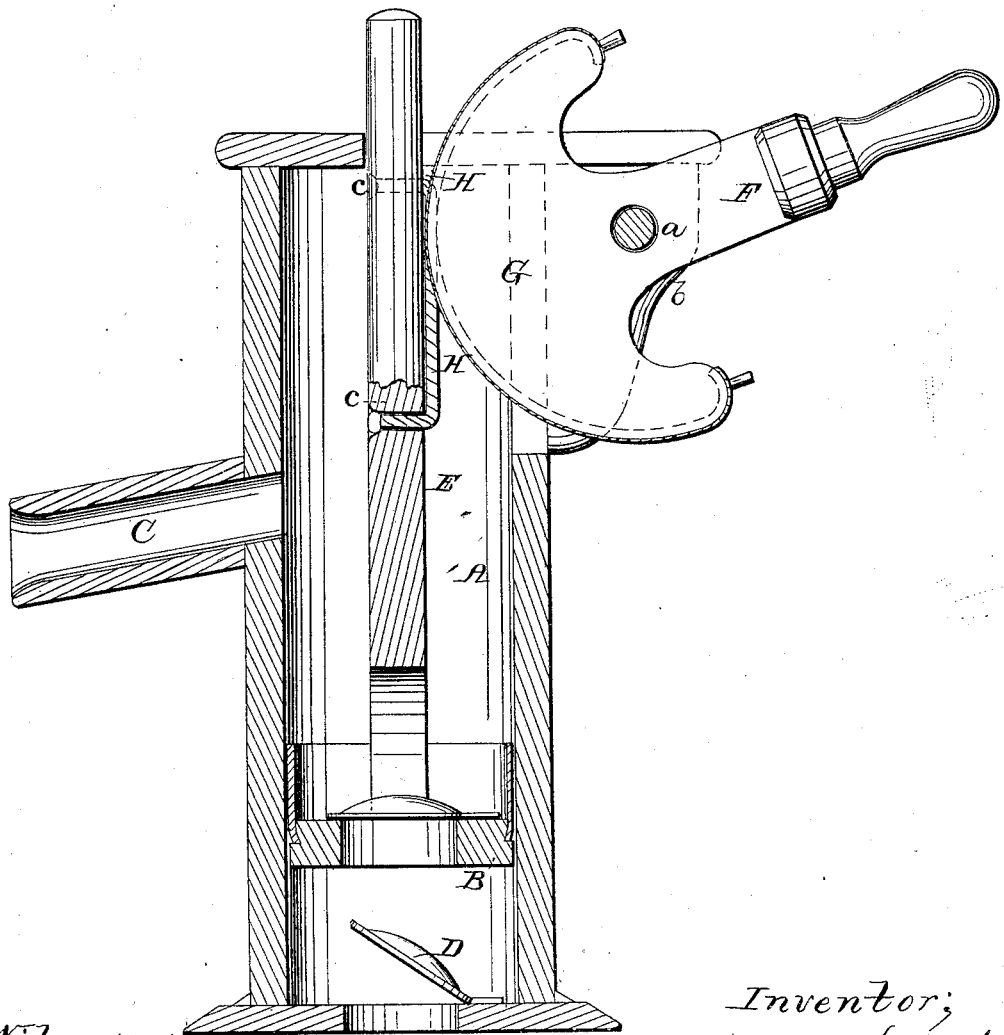

HIRAM HOSICK, OF PARIS, PENNSYLVANIA.

IMPROVEMENT IN PUMPS.

Specification forming part of Letters Patent No. 41,298, dated January 19, 1864.

*To all whom it may concern:*

Be it known that I, HIRAM HOSICK, of Paris, in the county of Washington and State of Pennsylvania, have invented a new and useful Improvement in Pumps; and I do hereby declare that the following is a full, clear, and exact description of the same, reference being had to the accompanying drawing, making a part of this specification, said drawing being a side sectional view of a lift-pump with my invention applied to it.

This invention relates to an improved mode of operating the piston of the pump, whereby a longer stroke of the piston is obtained than by the ordinary brake or lever and a proportionably greater quantity of water elevated within a given time and with greater facility or a less expenditure of power.

To enable those skilled in the art to fully understand and construct my invention, I will proceed to describe it.

A represents the body of the pump or pump-chamber, in which the piston B is fitted. C is the nozzle through which the water is discharged, and D is the check-valve at the bottom of the pump-chamber. These parts may be constructed in the usual way and therefore do not require a minute or particular description.

E is the piston-rod, the upper end of which passes through the top of the pump-chamber, and F is the brake or lever, the fulcrum a of which passes through lugs or ears b at the side of the pump-chamber. The inner end of this brake or lever F is of semicircular form, as shown at G, and to each end of G a cord or chain, H, is attached, said cords or chains being secured to the piston-rod E, as shown at c c. The semicircular end G of the brake or lever F is quite close to the piston-rod E, and may just touch it, the cords or chains H fitting in grooves in the periphery of G.

From the above description it will be seen that when the brake or lever F is operated the piston B will be moved up and down, the upper cord or chain forcing the piston down and the lower one raising it up, and it will also be seen that the cords or chains will be acted upon in a line parallel with the piston-rod E, and hence much friction will be avoided. Besides this advantage, a longer stroke than usual of the piston is obtained—that is to say, than can be obtained by the ordinary brake or lever—and, owing to the diminution of friction, with a less expenditure of power.

I do not claim, broadly, the use of straps and curved surfaces for producing rectilinear motion; but,

Having thus described my invention, what I claim as new, and desire to secure by Letters Patent, is—

Having the end of the pump-lever made in the form of a semi-circle, G, when combined with the cords H H and piston-rod E, in the manner herein shown and described.

HIRAM HOSICK.

Witnesses:
 JAMES BELL,
 ROBERT COCHRAN.